Dec. 2, 1969  A. D. MacARTHUR ETAL  3,481,531
IMPELLER BOUNDARY LAYER CONTROL DEVICE
Filed March 7, 1968  2 Sheets-Sheet 1
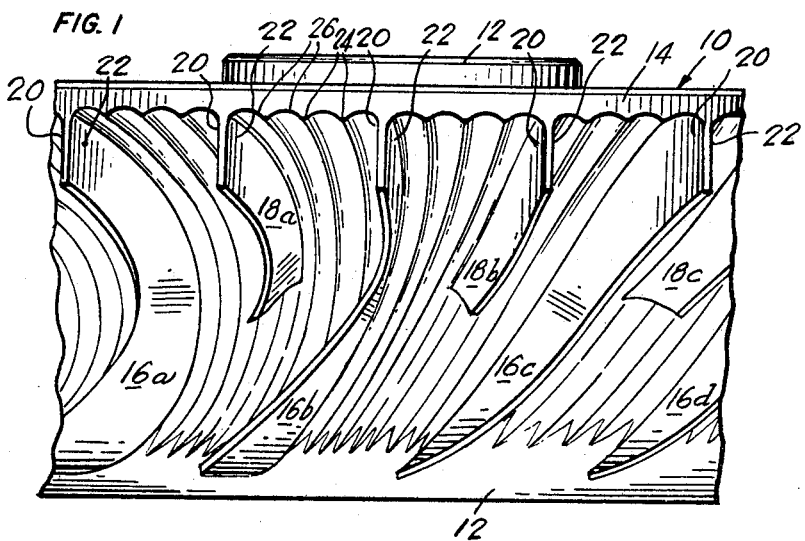
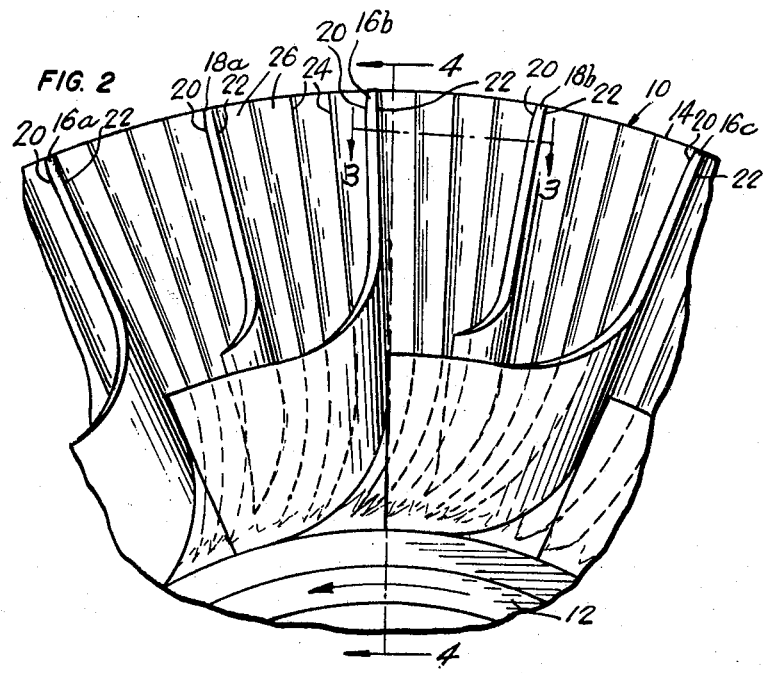
INVENTORS
Alexander D. MacARTHUR
Robert G. THOMPSON
ATTORNEY

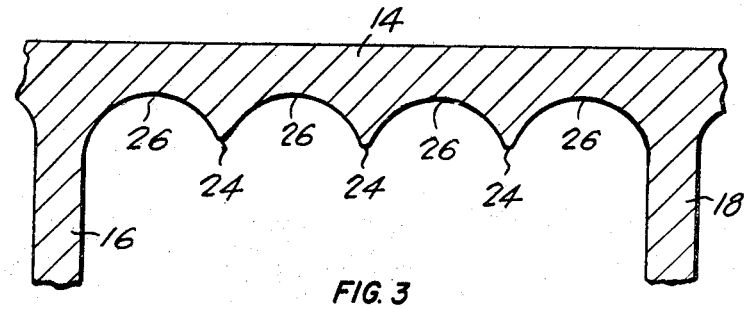
FIG. 3
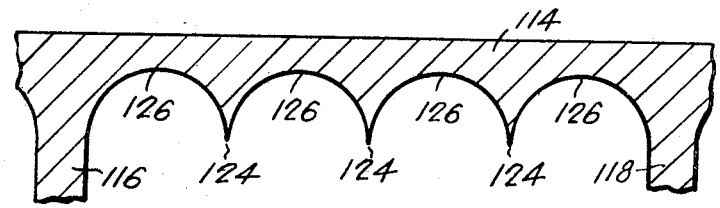
FIG. 5
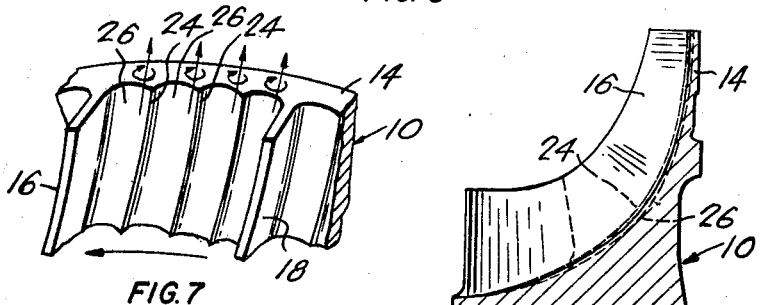
FIG. 7
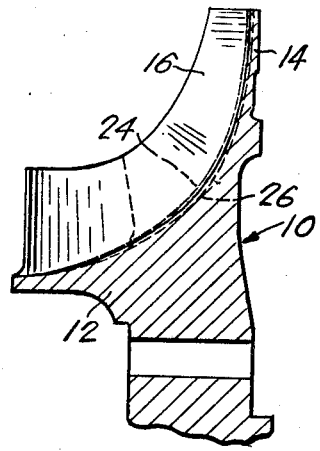
FIG. 4
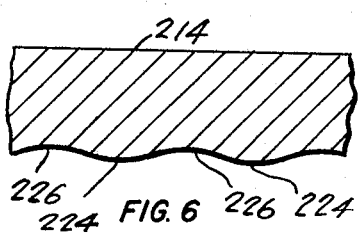
FIG. 6
INVENTORS
Alexander D. MacARTHUR
Robert G. THOMPSON
ATTORNEY

United States Patent Office 3,481,531
Patented Dec. 2, 1969

3,481,531
IMPELLER BOUNDARY LAYER
CONTROL DEVICE
Alexander D. MacArthur, St. Lambert, Quebec, and
Robert G. Thompson, Montreal, Quebec, Canada,
assignors to United Aircraft of Canada Limited,
Longueuil, Quebec, Canada
Filed Mar. 7, 1968, Ser. No. 711,385
Int. Cl. F04d 29/32; F01d 1/04, 3/00
U.S. Cl. 230—134    6 Claims

ABSTRACT OF THE DISCLOSURE

An impeller such as used in a centrifugal compressor in a turbine engine wherein the impeller has radially extending vanes and grooves defined in the annular wall between the vanes and parallel thereto.

---

The present invention relates to a centrifugal compressor and particularly to an impeller for use in a centrifugal compressor of a gas turbine of the type used in aircraft engines.

A typical impeller for use in centrifugal compression of gases, includes an annular wheel having an annular wall with a plurality of radially extending vanes. Each vane includes a pressure surface facing the direction of rotation and a suction surface, a pair of vanes define between their respective suction surface and pressure surface and the annular wall, a mass flow passage therebetween.

There are many factors which can affect the velocity profile of the mass flow such as temperature, blade configuration, etc. While not entirely certain it is believed that one of these factors is the boundary layer flow. When the impeller is in operation, the main stream of the mass flow is directed radially outwards in the direction of the impeller vanes but a layer of gas is said to adhere closely to and is retarded by the wheel wall. This layer, which is called a boundary layer, tends to migrate from the region of high static pressure near the pressure surface to a region of low static pressure near the suction surface. Since the boundary layer would be travelling in a cross-flow direction, fluid with velocity lower than the main stream velocity gathers in the low static pressure regions thus distorting the velocity profile and increasing the energy losses in the impeller passages and downstream of the impeller tip. In a turbine engine, for instance, the mass flow is led to the diffuser and the combustion chamber from the impeller where it is ideally preferable to have a steady flow in order to increase the diffusion efficiency and the efficiency of the combustion chamber.

The effects on the diffuser are thought to be of timewise varying incidence angle and inlet velocity. With a radial vaned impeller the primary effect of non-constant relative velocity leaving the impeller is estimated to be incidence angle variation at the diffuser leading edge. Thus only a portion of the fluid enters the diffuser at the best incidence angle and the net diffusion losses are greater than minimum losses.

It is an aim of the present invention to improve the efficiency of the centrifugal compressor, that is reducing energy losses by modifying the configuration of the impeller.

In accordance with the present invention, the annular wall of the impeller wheel is provided between the vanes with alternating elongated depressed and raised portions each extending parallel to the said vanes. This configuration has been shown to reduce energy losses and improve the efficiency thereof.

It is thought that an explanation for this phenomena is that the boundary layer is broken up by the parallel raised portions or ridges and the air is forced to spiral outwardly along the parallel depressions or grooves in the direction of the main stream mass flow thereby reducing cross flow velocity and thus reducing the distortion in the relative velocity profile.

Having thus generally described the nature of the invention, it will now be referred to in more detail by reference to the accompanying drawings illustrating preferred embodiments of the invention and in which:

FIGURE 1 is a fragmentary top plan view of the impeller;

FIGURE 2 is a fragmentary front elevation of the impeller;

FIGURE 3 is a horizontal cross-section taken along line 3—3 of FIGURE 2;

FIGURE 4 is a vertical cross section taken along line 4—4 in FIGURE 2;

FIGURE 5 is a view similar to FIGURE 3 but showing another embodiment;

FIGURE 6 is a view similar to FIGURES 3 and 5 but showing still another embodiment; and FIGURE 7 is a fragmentary perspective view of the impeller.

Referring now more specifically to the drawings, the centrifugal impeller is shown generally at 10 in FIGURES 1, 2, 4 and 7. The centrifugal impeller shown for example in the present application includes a hub 12 and an annular radially extending impeller wheel portion 14. A plurality of radially extending vanes 16a, 16b, 16c and 16d . . . interspaced by splitter vanes 18a, 18b, 18c . . . are provided on one face of the impeller wheel 10. The vanes 16a, 16b, 16c . . . extend, in the present case, from the lower hub portion 12 upwardly along the upper annular wheel portion 14 while the splitter vanes 18a, 18b and 18c and so on extend mostly along the annular radially extending wall portion 14.

The direction of rotation of the impeller in the present case is generally in a counterclockwise direction as shown by the arrows in the various figures. Each vane 16 or 18 has a pressure surface 20 which is on the side of the vane facing the direction of travel, a suction vane 22 on the opposite of each vane 16 or 18. The surface of the impeller wheel 10 between the vanes 16 and 18 is provided in a preferred embodiment with succession of grooves 26 and ridges 24.

In the most practical embodiment, the grooves 26 are fluted such as shown in FIGURE 3 and the ridges 24 are slightly rounded off. These grooves 26 and ridges 24 extend between the vanes 16 and 18 on each side thereof and are paralled thereto. In other words, the grooves and ridges 26 and 24 extend generally aligned with the direction of the mass air flow travelling radially between the vanes 16 and 18.

In the specific embodiment, when the impeller at an overall diameter of 9.344±.002 inches the depth of the groove 26 can be about .015 inch deep and about .125 inch wide. A determining factor in the depth to which the grooves 26 can be cut is the contoured tolerance band permitted on the specific impeller. The mean height of the succession of the grooves 26 and ridges 24 should be within this contoured tolerance band.

Further embodiment of the succession of the grooves and ridges can be made such as shown in FIGURES 5 and 6. In FIGURE 5, the grooves are much more pronounced and the depth thereof is equal to the radius of curvature or in other words the groove has a semi-circular cross section. (In FIGURE 5, the vanes 116 and 118 are shown in what would be a much closer relation than in FIGURE 3.) Since the mean depth of the grooves must also remain within the contour tolerance band, the width of the grooves 126 will be less.

At the other end of the range, the grooves and ridges could look like grooves and ridges 226 and 224 shown in FIGURE 6. Here the ridges are contoured so as to form a continuous wave with the grooves 226. This embodiment although effective is much more difficult to produce since after the machining of the grooves the ridges must be considerably polished in order to bring them into the proper configuration.

As described above, it is believed that the boundary layer which is formed at the surface of the wheel portion between the vanes tend to drift towards the suction surface 22 of the vanes 16 or 18. This distorts the mass air flow and therefore the velocity profile at the impeller edge is uneven. However it is believed that the ridges 24 and the grooves 26 break up the boundary layer to force it to spiral upwardly in the individual grooves 26 in the general direction of the mass air flow thus reducing distortion and evening out the velocity profile.

We claim:

1. An impeller for a high velocity gas turbine comprising a wheel having an axis of rotation and having an annular wall, a plurality of radially extending blades defining mass flow passages with the wall of the wheels; the surface of the wheel between adjacent blades being provided with alternating elongated depressed and raised portions each extending parallel to the adjacent blades.

2. An impeller as defined in claim 1 wherein the mean depth of the elongated depressions and raised portions is within the predetermined tolerance band of the impeller wheel.

3. An impeller as defined in claim 2 wherein the depressions are in the form of fluted grooves having a depth which is substantialy half the width thereof.

4. An impeller as defined in claim 2 wherein the depressions are in the form of fluted grooves and have a depth which is substantialy less than one quarter the width thereof.

5. An impeller as defined in claim 1 wherein the alternating depressions and raised portions have a cross-sectional configuration of a continuous wave.

6. An impeller as defined in claim 1 wherein the diameter of the impeller is in the order of 9 inches, the depth of the depressions in the order of .015 inch while the width of the depressions are in the order of .125 inch.

References Cited

UNITED STATES PATENTS

| 546,219 | 9/1895 | Behr | 103—115 |
|---|---|---|---|
| 1,697,202 | 1/1929 | Nagle | 103—115 |
| 2,737,898 | 3/1956 | Andermatt et al. | |

FOREIGN PATENTS 128,955  6/1919  Great Britain.

HENRY F. RADUAZO, Primary Examiner

U.S. Cl. X.R.

253—39, 55